Patented Nov. 14, 1950

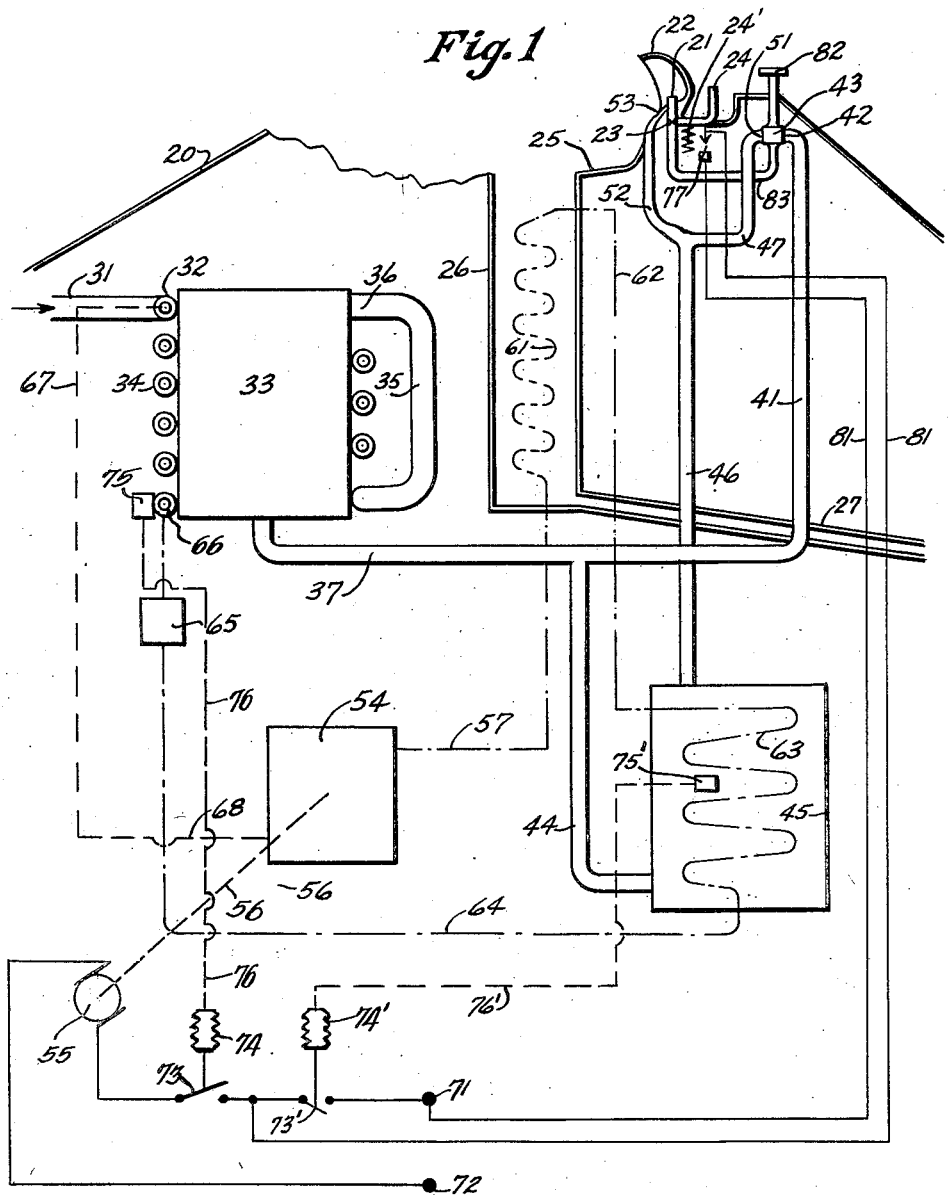

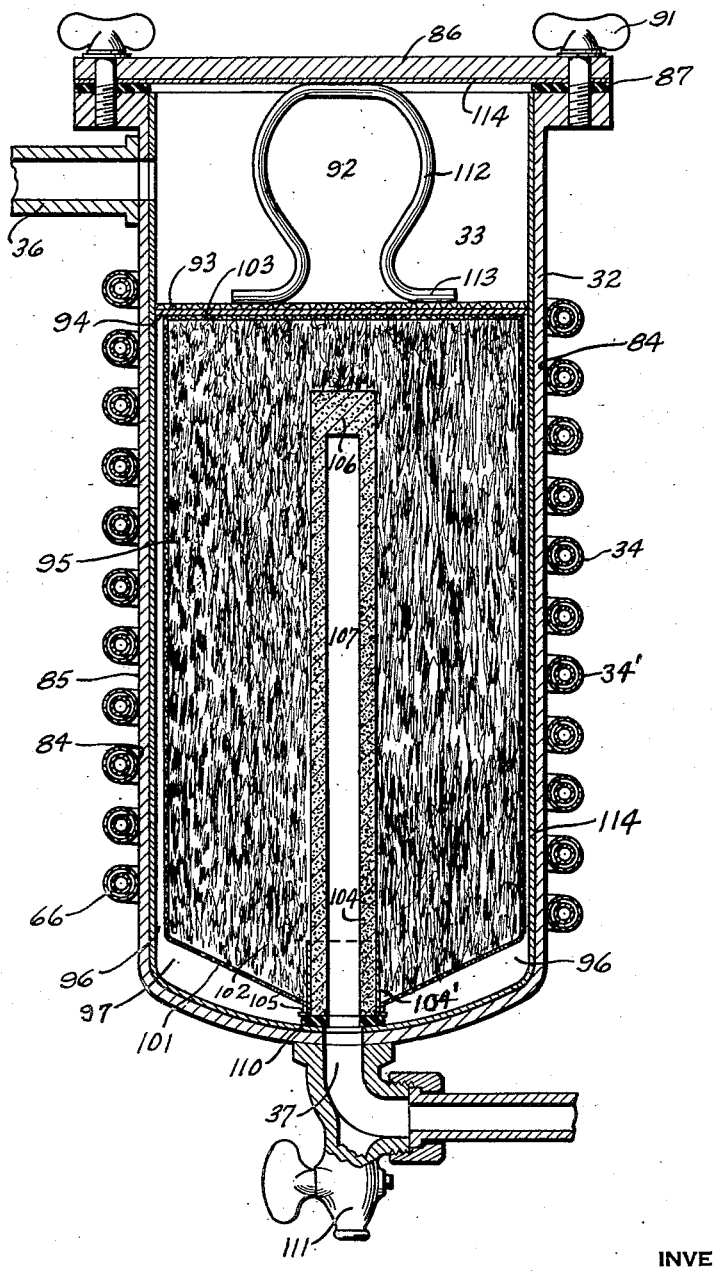

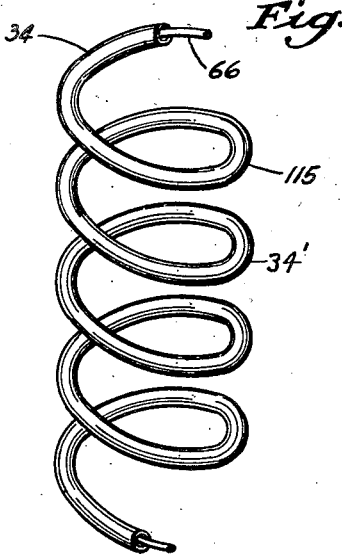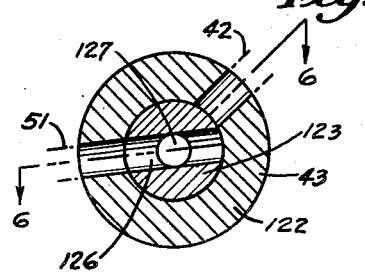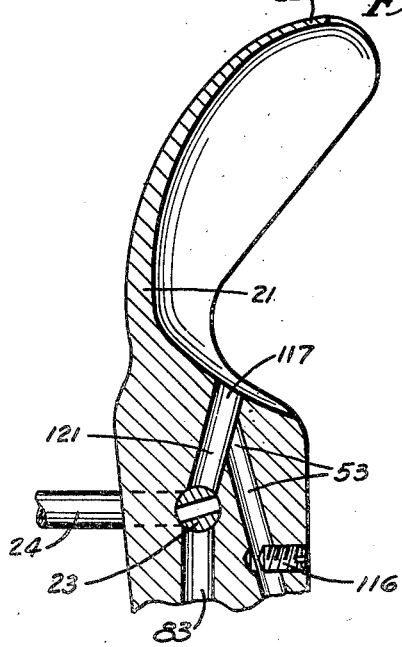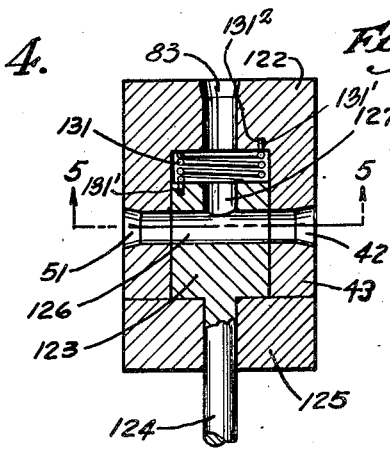

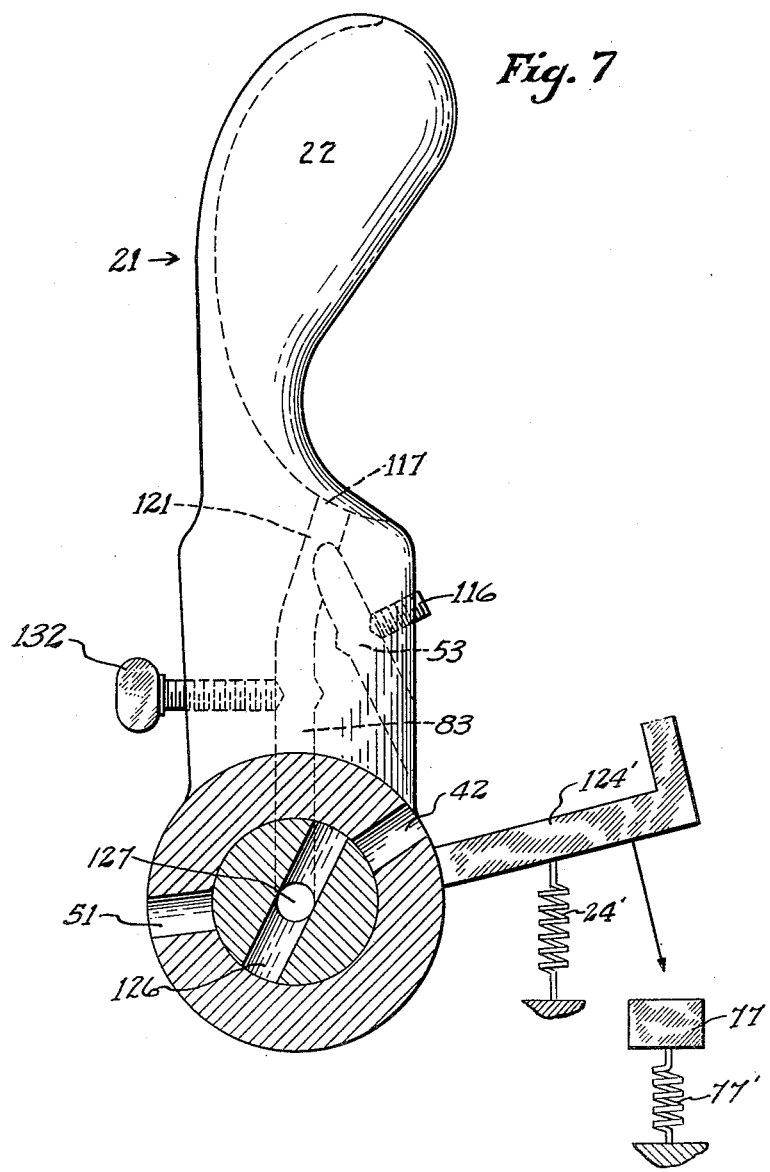

2,529,781

UNITED STATES PATENT OFFICE 2,529,781

WATER COOLER HAVING ADJUSTABLE DRINKING WATER TEMPERATURE AND WATER BLEED

Samuel O. Morrison, Media, Pa., assignor to Sunroc Refrigeration Company, Dover, Del., a corporation of Delaware Application January 27, 1947, Serial No. 724,636

13 Claims. (Cl. 62—7)

My invention relates to drinking fountains and water coolers, and apparatus for cooling and dispensing drinking water.

A purpose of my invention is to simplify the control of drinking water temperature at a drinking fountain to suit the taste of the individual user, or of the group of users by which the drinking fountain is being employed.

A further purpose is to maintain a body of drinking water in a drinking fountain at a low drinking water temperature and to maintain a further body of drinking water at a high drinking water temperature, independent of whether the ambient temperature be low or high, and to mix water from these two bodies to obtain water at the desired temperature for drinking.

A further purpose is to cool a substantial body of drinking water and to warm a portion of this drinking water for subsequent use in mixing to control the drinking water temperature.

A further purpose in a mechanical refrigeration cycle is to warm the drinking water by absorbing heat from refrigeration desirably in a condenser, thus providing a condenser source of warm water for mixing in a mixing valve.

A further purpose is to maintain a body of warm drinking water for mixing purposes in an auxiliary condenser, and to cool heated refrigerant also in a main condenser, preferably before such refrigerant is carried to the auxiliary condenser.

A further purpose is to operate the main condenser by drain water from a dispenser.

A further purpose is to provide an emergency control for an automatic refrigeration cycle in response to the temperature of drinking water in the auxiliary condenser, desirably supplementing this control by an independent control calling for refrigeration cycle operation whenever the dispenser is operating.

A further purpose is to provide a continuous bleed of drinking water through the dispenser so as to maintain flow in the heat transfer device, the drinking water filter and the auxiliary condenser, or any of the same, during periods when the dispenser is inactive, thus avoiding difficulty through corrosion and the like in the equipment mentioned, and at the same time flushing and purifying the dispenser against collection of dust and other extraneous material during inactive periods.

Further purposes appear in the specification and in the claims.

In the drawings I have chosen to illustrate a few only of the embodiments of the invention, selecting the forms shown from the standpoints of convenience in illustration, satisfactory operation and clear demonstration of the principles involved.

Figure 1 is a diagrammatic central vertical section of a water cooler to which my invention has been applied.

Figure 2 is an enlarged central vertical section of a heat transfer device and water filter which may be used in my invention.

Figure 3 is a diagrammatic elevation of a modified form of heat transfer device.

Figure 4 is an enlarged central vertical section of a drinking water dispenser.

Figure 5 is a section of a mixing valve on the line 5—5 of Figure 6.

Figure 6 is a section of the mixing valve on the line 6—6 of Figure 5.

Figure 7 is a view corresponding to Figure 5 showing a modification.

Describing in illustration but not in limitation and referring to the drawings:

In the prior art practice, the control of temperature of a drink dispensed by a drinking fountain or water cooler has caused difficulty due to the marked preferences of various users, leading some to demand comparatively cold drinking water, while others insist upon drinking water which is practically luke warm. Although the rule is by no means invariable, it is generally true that comparatively young persons are likely to desire to have a drinking fountain dispense water at a low drinking water temperature, whereas older people frequently desire drinking water of markedly higher temperature. While it is possible, of course, to change the setting of the refrigeration mechanism, this is not practical in the short interval of time between the use of the drinking fountain by various users.

The problem is considerably complicated by the fact that the ambient temperature changes markedly, especially on drinking fountains employed in ships and unheated industrial establishments, and the practice is, for reasons of mass production, to produce drinking fountains preferably of a standard design which are shipped to all parts of the world and likely to be employed in arctic, temperate and tropical climates. It is therefore difficult to obtain in one device bodies of drinking water at temperature corresponding with the extremes of temperature which different users may desire under all of the different climatic conditions which may be encountered.

Not only does the ambient temperature differ markedly, and therefore the effect of the ambient temperature on bodies of water in the cooler varies in different locations, but the temperature of the drinking water obtained from the domestic water supply is subject to the most wide variation, being in some cases and some seasons practically cold enough for drinking by those desiring the most rigorous low temperature, while in other cases the inlet water is hot enough to be practically universally unsatisfactory for drinking purposes. I find it necessary therefore to eliminate from the problem all of these uncertainties by providing a design for temperature control purposes which will operate under widely different conditions and therefore have the least difficulty to provide the desired temperature selection.

Figure 1 shows a typical drinking fountain to which the invention has been applied, consisting of a casing 20 suitably formed to mount a dispenser 21 having a guard 22, valve 23 and valve control handle 24 for operation by the user. It will be understood that the dispenser 21 may be either a bubbler for drinking or a drinking glass filler or other suitable device, preferably discharging any excess drinking water not received by the user into a depressed catch basin 25 which connects with a sump 26 discharging into a drain pipe 27.

Inlet water from the domestic water supply desirably enters a connection 31 to a heat transfer device 32, preferably of the tube-in-tube type, as later described more in detail. Built in as part of the heat transfer device 32 I preferably provide a water filter 33 which is connected to the tube-in-tube structure 34 by a connection 35 to the water filter inlet 36. The outlet from the water filter is by a connection 37 which has a branch 41 to one side 42 of a mixing valve 43. A second branch 44 of the connection 37 passes preferably to the bottom of an auxiliary condenser 45. Water from the top of the auxiliary condenser passes by a connection 46 and then through a branch 47 to the other side 51 of the mixing valve, and also through a by-pass branch 52 to the dispenser 21 at a point 53 beyond the valve 23.

The automatic refrigeration mechanism, preferably of the compression and expansion type, includes a compressor 54 of any suitable character driven by an electric motor 55 through mechanical connections 56. From the high side 57 of the compressor, refrigerant, suitably of the Freon type, is carried preferably to the bottom of a coil 61 in the sump 26, which forms the main condenser, the refrigerant being cooled by drainage water from the catch basin 25.

From the coil 61, preferably from the top, by a connection 62 the refrigerant is passed to the auxiliary condenser 45, entering its coil 63 preferably at the top in heat transfer relation with water introduced by the connection 44. From the auxiliary condenser, refrigerant is carried by the connection 64 through the constriction or expansion valve 65 to one end, preferably the bottom, of the refrigerant passage 66 of the heat transfer device 32. From the other end, preferably the top, of the refrigerant passage 66 refrigerant is carried by the connection 67 to the suction side 68 of the compressor.

The motor is operated from a suitable source of current supplied through terminals 71 and 72, the main control preferably being by a thermostatic switch 73, preferably operating as by a thermostatic bellows 74 in response to the temperature of a suitable thermostatic element such as a bulb 75, connected to the bellows by suitable connections, such as a tube 76. The bellows, bulb and tube contain an expansible liquid, as well known. The temperature responsive element 75 is preferably placed in heat responsive position with respect to the water leaving the tube-in-tube heat transfer structure 34, so that it can prevent a freeze-up, the switch 73 opening when the water temperature becomes excessively low (say 45° F.) and closing when it becomes excessively high (say 50° F.).

In addition to the normal control, I provide an emergency control operating on the temperature of the water in the auxiliary condenser, to prevent harm from overheating. A thermostatic switch 73′, in series with the switch 73, and normally closed, is opened in case of abnormal temperature (such as 110° F.) in the auxiliary condenser, as by a thermostatic bellows 74′ in response to the temperature of a suitable thermostatic element such as a bulb 75′, connected to the bellows as by a tube 76′. The closing of the switch 73 cannot start the compressor unless the switch 73′ is closed, or short circuited as later explained.

However, even in the case of undesirably high temperature of the water in the auxiliary condenser, it is often desired to have the refrigeration device able to operate in any case when the dispenser valve 23 is open, and this may be accomplished where desired by placing a switch 77 closed by pressing down on the dispenser handle 24 to open the dispenser valve, thus short circuiting the thermostatic switch 73′ by means of connections 81. The handle 24 is urged upward by spring 24′.

In the operation of this device, when the mechanism is operating and the dispenser is functioning to distribute drinking water, drinking water will enter the heat transfer device 32 and be rapidly cooled by the refrigerant in its refrigerant passages 66. The drinking water after passing through the heat transfer device will pass through the filter, the fact that it is already cooled aiding in preventing bacteriological difficulty in the filter and corrosion in the filter as set forth in my copending application Serial No. 650,437, filed February 27, 1946, for Filter and Temperature Control. Undesirable inclusions in the water including bacteria will be desirably reduced or eliminated by the filter.

From the filter the cooled drinking water will pass through the connection 37, and from thence partly to one side of the mixing valve 43, and partly into the auxiliary condenser 45, and thence in part to the other side of the mixing valve. The proportion in which drinking water will flow directly to the mixing valve and through the auxiliary condenser will be determined by the setting of the mixing valve as determined by the user, desirably by adjusting the mixing valve handle 82. In the mixing valve the warm and cold water will be mixed to attain any desired and selected temperature, and will then flow to the dispenser 21 through a connection 83, and be discharged through the dispenser.

A portion of the water passing through the dispenser will be drunk by the user, but in the ordinary case a substantial proportion will drop into the catch basin 25 and pass into the sump 26 over primary condenser coil 61, where a substantial amount of heat will be removed from refrigerant coming from the high side of the compressor 54, this heat being carried with the drainage water through the drain connection 27 to any suitable sewerage system. The refrigerant after passing through the main condenser, will pass through the auxiliary condenser 45 where excess heat will be removed by refrigerated water entering through the connection 44. From the auxiliary condenser 45 the cooled refrigerant will then pass through the constriction or expansion valve 65 to the refrigerant passages of the heat transfer device 32.

As long as the dispenser lever 24 is pressed and the switch 77 remains closed, the compressor will operate whenever dictated by closing of the thermostatic valve 74. As soon as the dispenser lever 24 is released and returns to its inactive position under the action of compression spring 24' opening switch 77, the compressor will be controlled by opening or closing the switch 73 in response to the temperature of the water in the tube-in-tube heat transfer device, but will not operate in case the emergency switch 73' opens due to the abnormal temperature in the auxiliary condenser 45. As soon as the temperature of the water in the auxiliary condenser 45 rises high enough to cause the thermostat to open switch 73', and provided the dispenser is not operating at that time, the compressor will stop and the refrigeration device will cease to operate until the water in the auxiliary condenser cools.

At all times a small flow of water will be carried through the by-pass 52 and the connection 53 to the dispenser, thus causing a limited flow of cold water from the heat transfer mechanism and filter through the auxiliary condenser to lower the high side refrigerant and auxiliary condenser water temperature after a period in case of prolonged inactivity. A further important function performed by the small drip through 53 is the flushing of the surface of the dispenser to remove the accumulated dust and other foreign matter. Not only does the bleed through 53 prevent continuous maintenance of water without change in the auxiliary condenser during inactive periods, but it also provides for a slow but steady flow through the filter 33 and the heat transfer device 32. This is important especially in the filter, where there may be a tendency to promote corrosion and develop fungi or bacteria in case of extended inactivity of the water, even where precautions are taken.

In some cases the filter 33 may not be used, but it is decidedly preferable. In Figure 2 I illustrate a suitable filter having the outer or water tubes of a tube-in-tube heat transfer unit 34 suitably brazed or welded at 84 to the filter casing 85, the refrigerant tubes 66 being carried through the interiors of the water tubes 34'.

Due to the fact that a metallic casing is provided, it will be evident that the interior of the filter is constantly refrigerated by the refrigerant in the refrigerant passages 66, so that not only is the drinking water refrigerated in the tube-in-tube construction, but it is kept cool as long as it remains on the interior of the filter, and the filter casing in effect provides a body of refrigerated drinking water.

The filter is provided with a removable cover 86 gasketed at 87 and tightened by screws 91. From the inlet 36 water passes into an inlet passage 92 and down through a coarse filter preferably consisting of a screen 93 and one or more layers of filter paper 94. Water passing through the coarse filter around the circumference of a filter cartridge 95 enters a transfer passage 96 extending annularly around the filter cartridge and having an end portion 97 at the end of the filter cartridge. The filter cartridge preferably comprises a filter bag 101 containing activated carbon or the like 102 as a filter medium, suitably stitched or otherwise joined to the coarse filter at 103 and suitably tied or otherwise fastened to an outlet tube 104 as at 105. The outlet tube 104 is preferably of porous carbon or the like and permits the flow of water through its closed end 106 as well as its side walls into a longitudinal outlet passage 107. It is surrounded by a plastic layer 104' to prevent short-circuiting to the outlet. The outlet tube is gasketed at 110 to the casing around an outlet connection 37. A drainage valve is provided at 111.

The cartridge is removable bodily, and is spring pressed from the cover by a spring 112 fastened to the cartridge at 113 and adapted to serve as a handle during removal.

The filter interior, including activated carbon, is likely to cause corrosion of the metallic casing, and accordingly the casing is lined with a metal at 114 such as silver, gold or platinum. Especially in the case of silver, there is a specific action in destruction of bacteria.

The filter as described in the above detail is not part of the present application. Other features are present in my application, Serial No. 650,437 aforesaid.

In some cases the heat transfer device may not include a filter, and in such instances it will be desirable to use the tube-in-tube device 115 having the outer tube 34' and inner tube 66 as shown in Figure 3.

Figure 4 illustrates one form of dispenser in more detail. The by-pass tube 53 is provided with an adjusting screw 116 to reduce the by-pass flow at the dispenser discharge orifice 117 to a small steady stream. The by-pass 53 desirably comes into the main passage 121 controlled by the valve 23 at a point close to the discharge orifice.

The mixing valve as shown in Figures 5 and 6 may be of any conventional or special type such as is well known for blending two streams of water into a single stream.

In these figures I illustrate conventionally a valve 43 having respective inlet connections 42 and 51 through a casing 122 into a valve member 123 controlled by adjustment stem 124 passing through a suitable packing not shown in a removable end 125 of the casing 122. The valve is cylindrical and rotatable, having a cross port 126 which in various positions will receive flow entirely from the inlet passage 42, entirely from the inlet passage 51, or in any proportion from either passage according to the angular positions of the passage as shown in Figure 5 and the dimensions of the passages and the port. Discharge from the port 126 is through a longitudinal discharge passage 127 into a discharge port 83. The valve is desirably spring urged endwise by a spring 131, acting between the casing 122 and the valve member 123.

It is frequently desirable to make the mixer valve return automatically to a position which corresponds with a normal or average drinking water temperature when not in use. The spring 131 may function as a torsion spring as well as a compression spring, hook ends 131' engaging in sockets $131^2$ at any suitable adjusted position in the casing 122 and in the valve member 123. Thus the mixer valve will return in either direction to the normal setting after use.

I may, if desired, modify the mixing valve of Figures 5 and 6 to combine it with the dispenser and to make it perform the function of the dispenser valve 23. Thus as shown in Figure 7, the dispenser is mounted on the end of the mixing valve, inlet to the mixing valve being provided as before through the connections 42 and 51. The valve element normally remains in a position as shown in Figure 7, closing access from both ports 42 and 51 to the central port 127 which connects at the end to the passage 83 through the dispenser. The operating lever 124' on the stem 124 (shown in Figure 6 and sectioned away in Figure 7) when pushed down against the action of compression spring 24' connects the port 127 and the passage 83 first with the passage 42, admitting comparatively cold drinking water to the dispenser, and then to the passage 42 and 51 in various proportions, admitting more and more comparatively warm drinking water, and finally to the passage 51 entirely admitting entirely warm water. The contact of the switch 77 is desirably backed up by a compression spring 77' so that the operating lever 124' can continue in motion after contact has been made.

The volume of flow through the dispenser as the mixer valve opens is suitably controlled as by a valve 132 which may remain set as long as substantial pressure variation does not occur, but can be varied conveniently by the user if the flow is excessive or inadequate. The by-pass 53 functions as in the other form.

It will thus be seen that in the form of Figure 7 when the operating handle 124' is in its limiting upper portion, the dispenser is cut off from flow except through the by-pass, which allows a small trickle or bleed. As soon as the handle is pressed down far enough to permit flow from the port 42, a comparatively cold drink is available at the dispenser, and on further pressure the drink becomes progressively warmer. The used may therefore simply adjust the dispenser handle to turn on the dispenser and control the mixing valve in this form.

It will be evident that the valve is only one of many which might be used for this purpose.

In accordance with the present invention, it is possible to obtain a drink at any selected temperature over a wide range of temperatures, and at the same time the operation of the device is aided by using the cooled water in part for operation of the auxiliary condenser. Since all water from the inlet is cooled to a low drinking water temperature, all errors in the device due to the temperature of the inlet water are eliminated. Likewise, since the device is controlled normally by the temperature of the auxiliary condenser water, a source of water in the auxiliary condenser will also be available at a somewhat warm predetermined temperature or at a temperature close thereto, regardless of the ambient or the inlet water temperature within a considerable range of variation. It will be evident of course that the capacity of the tube-in-tube and the filter and the capacity of the condenser may be regulated with respect to the drinking water demand, so that any desired quantity of drinking water may be available in the source of water at low temperature and in the source of water at high drinking water temperature for bleeding and for the mixing valve as desired.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a drinking fountain, automatic refrigeration means for cooling drinking water to a comparatively low drinking water temperature, means for warming a portion of the cooled drinking water to a comparatively high drinking water temperature, a mixing valve accessible to adjustment by the user, connections to the mixing valve for water at the comparatively low and comparatively high drinking water temperatures, a dispenser and connections from the mixing valve to the dispenser for distributing the mixed effluent from the mixing valve.

2. In a drinking fountain, automatic refrigeration means for refrigerating a body of drinking water using a refrigerant and including a condenser, means for passing a portion of the cooled drinking water from the means for refrigerating through the condenser and thereby warming the same by heat absorbed from the refrigerant in the condenser, a mixing valve accessible for adjustment, connections for supplying cool drinking water and also drinking water warmed by the condenser to the mixing valve, a dispenser and connections for supplying mixed drinking water to the dispenser from the mixing valve.

3. In a drinking fountain, a refrigerating system including a heat transfer device for cooling drinking water, a main condenser and an auxiliary condenser, means for passing a portion of the drinking water cooled in the heat transfer device through the auxiliary condenser, a mixing valve, connections for withdrawing comparatively cold water to the mixing valve from the heat transfer device and comparatively warm water to the mixing valve from the auxiliary condenser, a dispenser and connections to the dispenser for supplying a selected mixture of cold and warm water from the mixing valve to the dispenser.

4. In a drinking fountain, a refrigeration unit including a heat transfer device for cooling drinking water, a main condenser and an auxiliary condenser, means for passing drinking water to be cooled through the heat transfer device, means for passing a portion of the cooled drinking water through the auxiliary condenser, a mixing valve subject to adjustment, connections for supplying comparatively cool drinking water from the heat transfer device and comparatively warm drinking water from the auxiliary condenser to the mixing valve, a dispenser, means for carrying a predetermined mixture of cool and warm drinking water from the mixing valve to the dispenser and means for carrying drainage water from the dispenser through the main condenser.

5. In a drinking fountain, a refrigeration unit including a heat transfer device for cooling drinking water, a main condenser and an auxiliary condenser, means for passing drinking water to be cooled through the heat transfer device, means for passing a portion of the cooled drinking water through the auxiliar condenser, a mixing valve subject to adjustment, connections for supplying comparatively cool drinking water from the heat transfer device and comparatively warm drinking water from the auxiliary condenser to the mixing valve, a dispenser, means for carrying a predetermined mixture of cool and warm drinking water from the mixing valve to the dispenser and means for carrying drainage water from the dispenser through the main condenser, the main condenser being connected in the refrigerant cycle ahead of the auxiliary condenser.

6. In a drinking fountain, a refrigerant unit including a heat transfer device for cooling drinking water, a main condenser and an auxiliary condenser, the condensers being connected with the refrigerant unit, means for passing drinking water through the heat transfer device, means for passing a portion of the drinking water cooled in the heat transfer device through the auxiliary condenser, a dispenser, means for passing cooled drinking water from the heat transfer device to the dispenser, and emergency means for interrupting the operation of the refrigerant unit in response to the temperature in the auxiliary condenser.

7. In a drinking fountain, a refrigerant unit including a heat transfer device for cooling drinking water, a main condenser and an auxiliary condenser, the condensers being connected with the refrigerant unit, means for passing drinking water through the heat transfer device, means for passing a portion of the drinking water cooled in the heat transfer device through the auxiliary condenser, a dispenser, means for passing cooled drinking water from the heat transfer device and heated drinking water from the auxiliary condenser to the dispenser, and emergency means for interrupting the operation of the refrigerant unit in response to the temperature of the water in the auxiliary condenser.

8. In a drinking fountain, a refrigerant unit including a heat transfer device for cooling drinking water, and a condenser, means for passing drinking water to be cooled through the heat transfer device, means for passing a portion of the cooled drinking water through the condenser, a dispenser, means for conveying drinking water to the dispenser from both the heat transfer device and from the condenser, means for controlling the operation of the refrigeration unit, emergency means for interrputing the operation in response to the temperature of the water in the condenser and auxiliary means for operating the refrigerant unit whenever the dispenser operates.

9. In a drinking fountain, a refrigerant unit including a heat transfer device, a dispenser having a valve for controlling discharge of drinking water, connections for passing drinking water through the heat transfer device and to the dispenser and a continuously open bleed around the value for discharging drinking water continuously into the dispenser and in flushing relation over its surface regardless of whether the dispenser valve is open or not.

10. In a drinking fountain, a refrigerant unit including a heat transfer device for cooling drinking water, a water filter, means for passing drinking water through the heat transfer device and then through the water filter, a dispenser having a valve for controlling discharge of drinking water, means for passing drinking water from the water filter to the dispenser and a continuously open controlled by-pass for supplying a continuous stream of drinking water from the filter through the dispenser and in flushing relation over its surface regardless of whether the dispenser valve is open or closed.

11. In a drinking fountain, a refrigerant unit including a heat transfer device for cooling drinking water and a condenser, means for passing drinking water to be cooled through the heat transfer device, means for passing a portion of the cooled drinking water from the heat transfer device to the condenser, a dispenser having a valve for controlling the discharge of drinking water, means for passing drinking water to the dispenser from the heat transfer device and also from the condenser and a by-pass conducting drinking water from the condenser through the dispenser independently of whether the dispenser valve is open.

12. In a drinking fountain, a refrigeration unit including a heat transfer device and a condenser, means for passing drinking water through the heat transfer device, a water filter, means for passing drinking water from the heat transfer device through the water filter, a mixing valve, means for passing drinking water from the water filter directly to the mixing valve and also through the condenser to the mixing valve, a dispenser having a valve, means for passing mixed drinking water from the mixing valve to the dispenser and a by-pass connection for passing water continuously from the condenser to the dispenser without going through the dispenser valve.

13. In a drinking fountain, a refrigerant unit including a heat transfer device for cooling drinking water, and a condenser, means for passing drinking water through the heat transfer device, means for passing a portion of the drinking water cooled in the heat transfer device through the condenser, a dispenser, means for passing cooled drinking water from the heat transfer device to the dispenser, a bleed through the dispenser, means for passing a continuous flow of water from the condenser through the bleed and means for interrupting the operation of the refrigerant unit in response to the temperature in the condenser.

SAMUEL O. MORRISON.

REFERENCES CITED

The following references are of record in the file of this patent:

UNITED STATES PATENTS

| Number | Name | Date |
|---|---|---|
| 1,899,013 | Candor | Feb. 28, 1933 |
| 1,960,975 | Mulch | May 29, 1934 |
| 2,095,017 | Wilkes | Oct. 5, 1937 |
| 2,127,848 | Smith | Aug. 23, 1938 |
| 2,255,967 | Collins | Sept. 16, 1941 |

FOREIGN PATENTS

| Number | Country | Date |
|---|---|---|
| 487,762 | France | July 24, 1918 |